United States Patent [19]
Cole

[11] Patent Number: 5,702,316
[45] Date of Patent: Dec. 30, 1997

[54] MODULAR SPLIT SPROCKET ASSEMBLY

[76] Inventor: Daniel D. Cole, 2430 The Haul Over, John's Island, S.C. 29455-6103

[21] Appl. No.: 560,804

[22] Filed: Nov. 21, 1995

[51] Int. Cl.$^6$ ............................................. F16H 55/12
[52] U.S. Cl. ............................................. 474/96; 474/95
[58] Field of Search ................................ 474/95-99, 902; 74/447, 448; 301/10.1, 14

[56] References Cited

U.S. PATENT DOCUMENTS

| | | | |
|---|---|---|---|
| 260,462 | 7/1882 | Dodge et al. | 474/98 |
| 1,228,265 | 5/1917 | Unger | 74/447 |
| 1,983,845 | 12/1934 | Evenburgh | 474/902 |
| 4,031,769 | 6/1977 | Kassing | 74/243 |
| 5,322,478 | 6/1994 | Bos et al. | 474/95 |

OTHER PUBLICATIONS

Top Split–Sprockets, top–Fördertechnik GmbH brochure.
Rexnord Engineering Manual #831270–R, 1983, 1985, pp. 72–73.

*Primary Examiner*—Tamara L. Graysay
*Assistant Examiner*—Gary S. Hartmann
*Attorney, Agent, or Firm*—Andrus, Sceales, Starke & Sawall

[57] ABSTRACT

A split sprocket assembly mountable on a shaft comprises a pair of substantially semi-circular sprocket halves, each of the sprocket halves having a mating face joined at a split line between the sprocket halves and having a concentric bore. Each of the sprocket halves further has a plurality of teeth provided about its periphery and a series of tooth pockets also formed about its periphery between each pair of adjacent teeth. A hub having a throughhole disposed around the shaft is disposed in the concentric bore. The sprocket halves and the hub include two sets of diametrically opposite, aligned apertures, each of the aligned apertures extending radially inwardly from one of the tooth pockets on the periphery of the sprocket halves and into the hub. A fastener is provided within each of the aligned apertures for joining the sprocket halves and the hub together to form a split sprocket assembly readily attachable and detachable from said shaft.

3 Claims, 3 Drawing Sheets

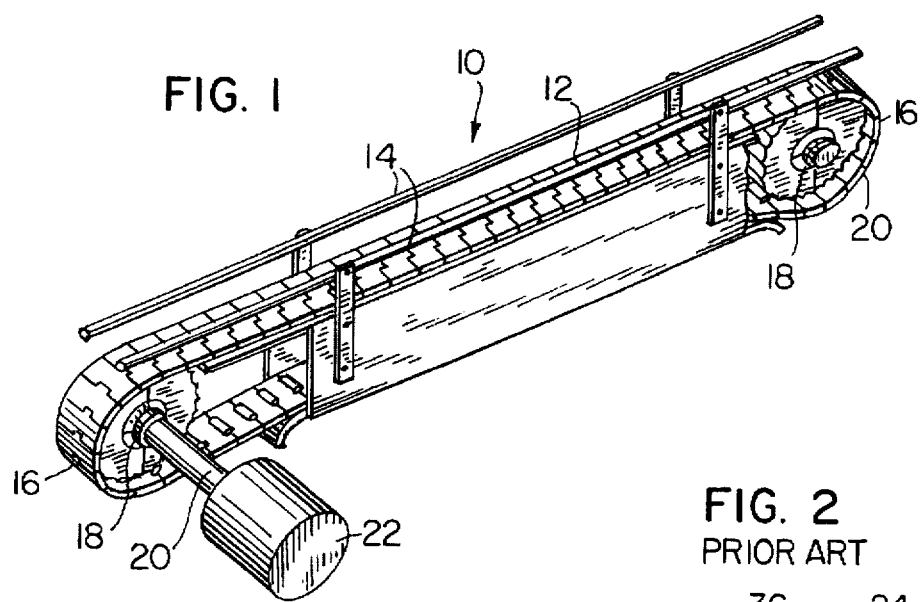
FIG. 1
FIG. 2
PRIOR ART
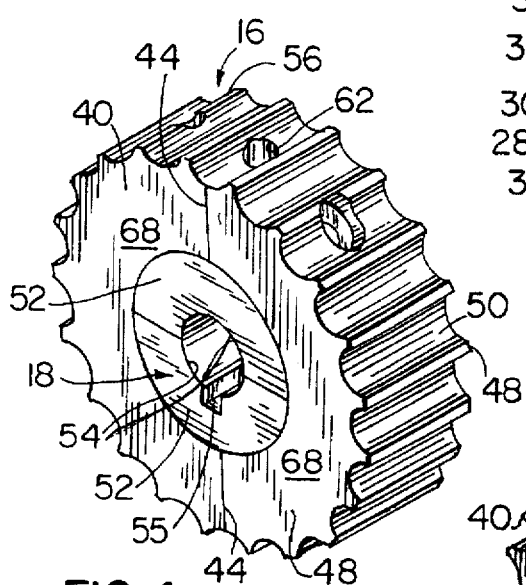
FIG. 4
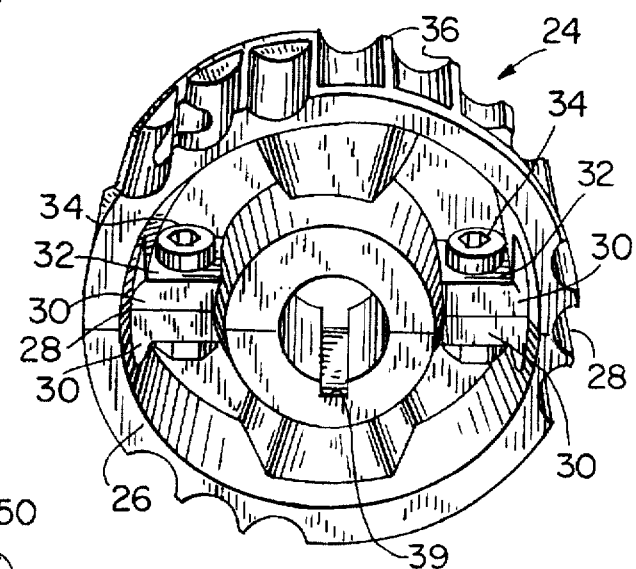
FIG. 6

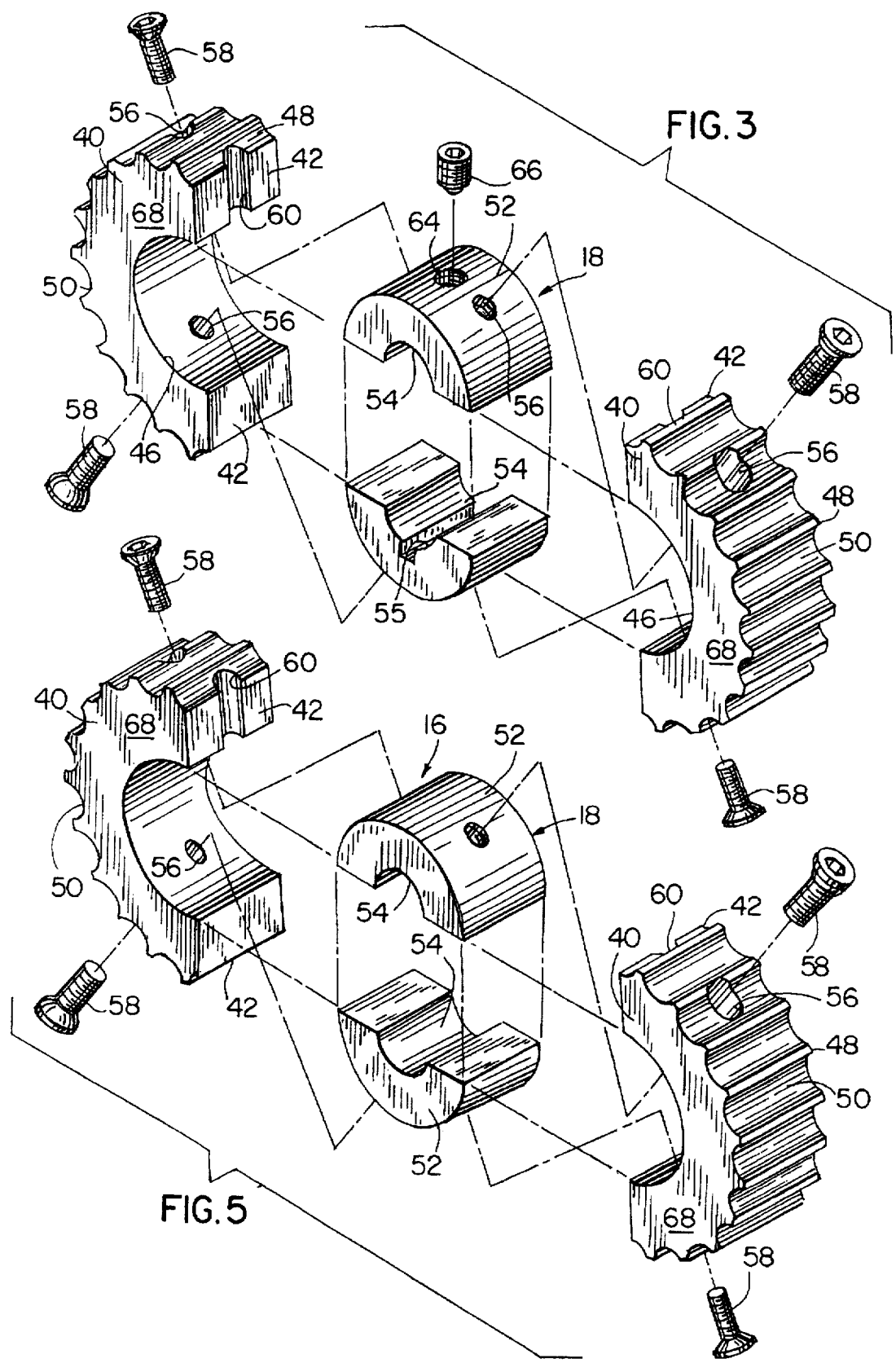

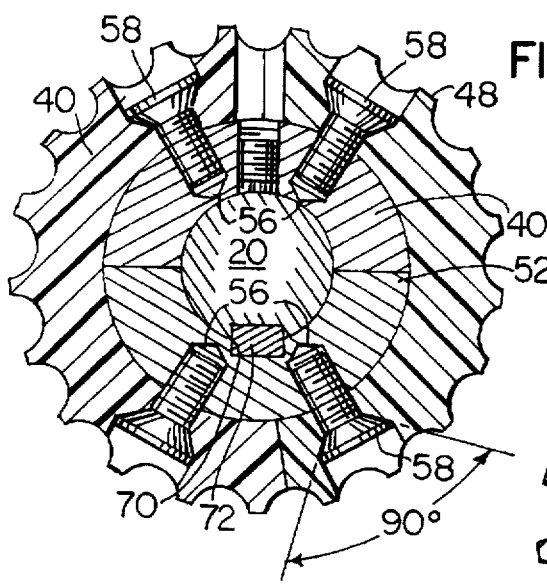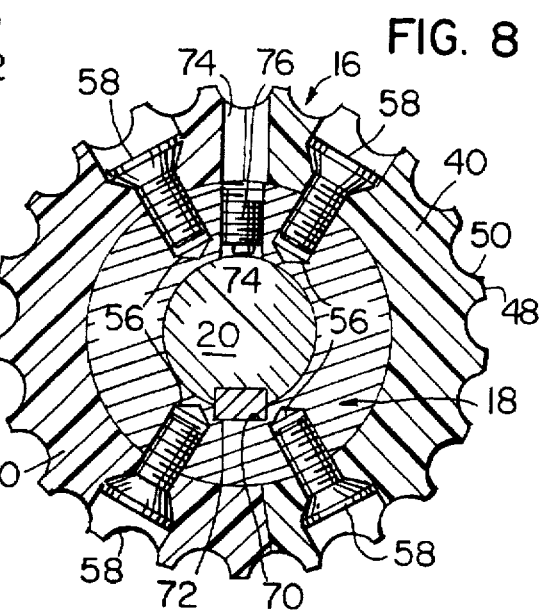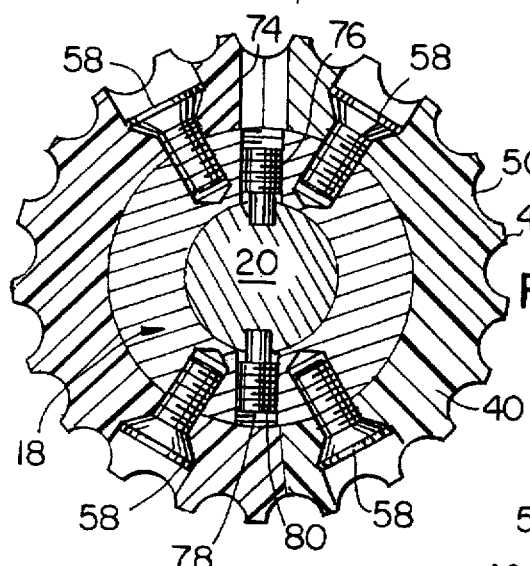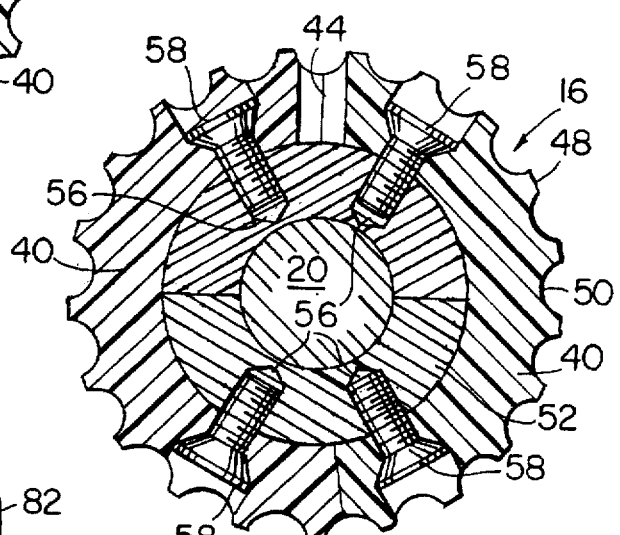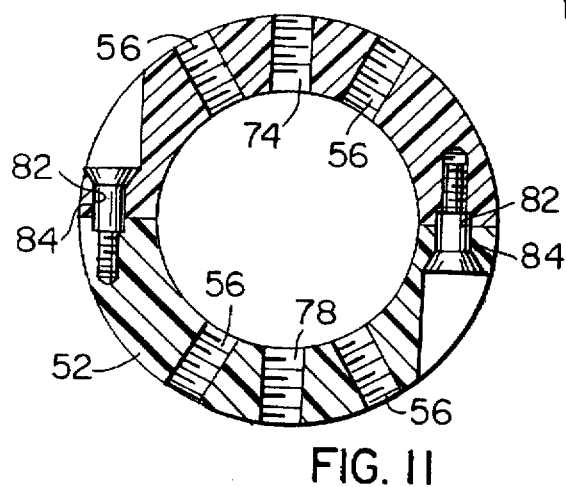

MODULAR SPLIT SPROCKET ASSEMBLY

FIELD OF THE INVENTION

This invention relates broadly to split sprocket assemblies such as used in conveyor systems and, more particularly, pertains to a split sprocket assembly which allows a sprocket to be positioned on a drive shaft, utilizing a key-way, set screw or other means to provide the necessary torque.

BACKGROUND OF THE INVENTION

Over the recent years, certain chain applications have favored plastic sprocket materials in place of a semi-steel or cast-iron body along with a split two-piece design over the conventional one-piece sprocket construction. Split sprocket assemblies are available at an economical production cost for most common plastic sprocket types and sizes, and also allow the user an easier retrofit, quieter operation and provide good corrosion resistance in the majority of all cases. The most commonly used plastic drive sprockets and return idlers either as one-piece or two-piece construction are made from molded glass fiber-reinforced polyamide as well as cast polyamide. In order to achieve a good mold without cavities, one has to maintain certain wall thickness relationships throughout the shape of a sprocket. This causes all molded sprockets to have a spoked or other form of reinforced shape and design necessary to achieve the required stiffness and load carrying capability. Unfortunately, this design causes molded sprockets to have many pockets and dirt traps which are typical places for bacteria to form and develop. Particularly in the food and beverage industries, this is of great concern and must be avoided. To overcome this drawback, some manufacturers recently have added discs on either side of the sprocket to close those pockets to the outside, obviously sacrificing some of the manufacturing economies by adding more parts and assembly costs. It is not certain, however, that those pressed in lids or discs are sealed tight either. Therefore, more elaborate efforts like supersonic welding of the plastic components have been introduced adding further cost to the production process.

A major shortcoming that has been recognized with plastic sprockets is in the key-way section. A typical drive shaft and corresponding standard key size are designed to match steel shafts with steel and/or cast-iron sprocket materials capable of carrying high specific surface pressure loading without fatigue failure. Since the plastic sprocket has to operate under the same conditions using the same key and matching key-way dimensions originally designed for steel components, overloading of the plastic material can occur in this vital area. As a result, most molded sprockets operating under high load deteriorate before the tooth form or chain links wear out. Some better strength and resistance against key-way shear and fatigue pressure are provided by full bodied machined drive sprockets made from cast polyamide material. However, under continuous high load operation with many starts and stops or even reversing torque drives, their key-way will not last either. Field service reveals that most original equipment manufactured equipment designed for higher performance, load or output might get through the initial warranty period without immediate failure of plastic sprockets. But typically, a two or three shift operation of the production line causes the need for a stronger key-way connection to avoid unexpected downtime during continuous operation. Some more elaborate and, therefore, more expensive plastic sprocket constructions have a molded in or inserted reinforcing steel member to help overcome this weak spot. Currently, those sprockets are available only as onepiece construction and fail the convenience of an easy replacement in the field, causing removal of the drive shaft and bearings with retrofit. The most expensive drive sprockets today feature stainless steel hubs with split plastic tooth segments for replacement. The manufacture of those hubs is extremely costly and the flange-diameter for bolt assembly limits the application to a 21 tooth sprocket size or larger, depending on type. Most commonly used sprocket teeth number from 17–25 along the periphery of the sprocket. Since many larger users and also distributors need to cover a certain range of different numbers of teeth and also four or more bore sizes, their stocking logistics and amount of necessary inventory can become a burden. The variety required to carry all constructions with different finished bores for at least four different numbers of teeth per sprocket and/or idler wheel type makes this often a cumbersome financial investment or requires finished bore machining on site. Also, with molded sprockets, one cannot stock a rough bore type and machine any finish bore afterwards because the wall thickness limitations allow only to finish machine two bore sizes per stocked unit.

Accordingly, it is desirable to provide a split sprocket assembly which allows for application in corrosive environments and allows for easy cleaning with no bacteria traps. It is also desirable to provide a split sprocket assembly which enables radial assembly of sprocket halves to a hub, allowing assembly and disassembly relative to the conveyor drive shaft in the narrowest space available and without removal of the conveyor drive shaft. It is within the purview of the invention to provide a modular split sprocket assembly wherein each pair of sprocket halves is interchangeable with every hub so as to ensure the lowest inventory cost for the largest variety possible. Moreover, the present invention contemplates the provision of drive sprocket torque transmittal between the drive shaft and the hub either by key and key-way connection and/or by set screw feature or other types of hub to shaft connectors. In addition, a split hub design allows split sprocket assembly with or without transverse fastening screws.

SUMMARY OF THE INVENTION

The present invention advantageously provides a split sprocket assembly which does not require disassembly of the conveyor drive shaft and shaft support bearings for retrofit or initial installation. The radial bolting of the sprocket halves to the circular hub and their symmetric positioning allows for equal load distribution and torque transmittal. The split sprocket assembly does not use any nuts, shear pins, or positioning pins for assembly, but instead relies on socket cap screws which provide for both bolt tensioning and transmittal of shear load as well as automatic centering of the sprocket halves on the hub. Every hub and toothed segment combination can be assembled with each other as idler combinations if required.

In one aspect of the invention, a split sprocket assembly mountable on a shaft comprises a pair of substantially semi-circular sprocket halves, each of the sprocket halves faces are joined at a split line between the sprocket halves and having a concentric bore. Each of the sprocket halves further has a plurality of teeth provided about its periphery, and a series of tooth pockets also formed about its periphery between each pair of adjacent teeth. A solid or split hub having a throughhole disposed around the shaft is positioned in the concentric bore. The sprocket halves and the hub halves include two sets of diametrically opposite, aligned apertures, each of the aligned apertures extending radially inwardly from one of the tooth pockets on the periphery of the sprocket halves and into the hub. A fastener is provided within each of the aligned apertures for joining the sprocket halves and the hub halves together to form a split sprocket assembly readily attachable and detachable from the shaft.

One of the sprocket halves is formed with an opening extending radially inwardly from the periphery of one of the sprocket halves to the concentric bore. In one embodiment, the hub is formed with a key-way in one of the sprocket halves and the hub includes a further set of aligned apertures located opposite the key-way and extending radially inwardly from the periphery of one of the sprocket halves and completely through the hub. The assembly includes a retainer disposed within the furthest set of aligned apertures and engageable against the shaft, and a key engageable with the key-way and the shaft to join the hub to the shaft. The hub is comprised either of a single one-piece member or of two halves.

In another embodiment, the hub is formed with a passageway extending radially inwardly from the periphery of the hub and completely through the hub. One of the toothed halves and the hub includes a further set of aligned apertures located opposite the passageway and extending radially inwardly from the periphery of one of the toothed halves and completely through the solid hub. The assembly includes a pair of set screws, one of the set screws being located in the passageway and the other of the set screws being located in the further set of aligned apertures. Both of the set screws extend into the shaft and enable the hub to transmit required torque.

In yet another embodiment, each of the mating halves of the hub is formed with a cross fixing bore oriented substantially perpendicular to the axis of shaft rotation. Each of the cross fixing bores receives a fastener for enabling the hub to mounted about the shaft. Each of the sprocket halves and the hub are formed with flat surfaces and each of the sprocket halves and the hub are preferably formed of a strong and corrosion resistant material. Alternatively, the hub may be formed of stainless steel.

BRIEF DESCRIPTION OF THE DRAWINGS

The invention will become better understood by reference to the following detailed description of the preferred exemplary embodiment when read in conjunction with the appended drawing wherein like numerals denote like elements; and FIG. 1 is perspective view of a straight running conveyor designed employing the molded split sprocket assembly of the present invention;

FIG. 2 is perspective view of a prior art molded split sprocket assembly;

FIG. 3 is an exploded view of the new split sprocket assembly employing a split hub with key-way;

FIG. 4 is a perspective view of the assembled version of FIG. 3;

FIG. 5 is an exploded view of the split idler assembly employing a plastic hub;

FIG. 6 is a perspective view of the assembled version of FIG. 5;

FIG. 7 is a sectional view of a split sprocket assembly showing a split hub positioned on the shaft by means of a set screw and key-way and key for torque transmission;

FIG. 8 is a sectional view of a split sprocket assembly having a solid hub positioned on the shaft by means of a set screw and key-way for torque transmission;

FIG. 9 is a sectional view of a split sprocket assembly having a solid hub secured to the shaft by means of diametrically opposed set screws extending into the driving shaft;

FIG. 10 is a split idler assembly having a split plastic hub which rotates freely on the shaft; and FIG. 11 is a sectional view of a split hub provided with optional cross fixing fasteners for securing the hub to the shaft.

DETAILED DESCRIPTION OF THE PREFERRED EXEMPLARY EMBODIMENT

Referring now to the drawings, FIG. 1 illustrates a typical section of a straight running conveyor 10 employing a concatenated series of connected flat-top or table-top chain links 12 used to convey objects along a path of travel defined by a pair of guide rails 14. As is well known, the conveyor 10 is, in this case, driven at a proximal end by means of a split sprocket assembly 16 having a hub 18 which is keyed or otherwise affixed to a rotary drive shaft 20 which in turn is powered by a drive motor 22. The distal end of the conveyor 10 is provided with a split idler assembly 16 having a hub 18 which revolves freely around its shaft 20 and acts as an idler.

Prior art split sprocket assemblies 24 such as the type shown in FIG. 2 comprise a pair of essentially, semi-circular, plastic sprocket halves 26 having faces 28 joined along complementary flanges 30. Each of the flanges 30 has a pair of apertures 32 formed therein for receiving a pair of cross fixing bolts 34 oriented transversely to the axis of rotation of the sprocket assembly 24. Each of the sprocket halves 26 also has a plurality of chain engaging teeth 36 about its periphery and is provided with integral mating hub sections 38 disposed about and keyed at 39 with a drive shaft (not shown). In order to achieve the desired stiffness and load carrying capability, this prior art sprocket assembly 24 is molded with a spoked or reinforced shape and design.

This molded sprocket assembly 24 is susceptible to overloading due to design of the key-way and the hub sections 38. Furthermore, end users employing this type of split sprocket assembly are forced to stock and maintain a large inventory of different type sprockets with various numbers of teeth and finished bores.

In contrast, the present invention provides a split sprocket assembly 16 which overcomes the drawbacks of the prior art and offers a number of alternative mounting structures among the sprocket halves, the hub and the conveyor drive shaft. Turning now to FIGS. 3–6, the split sprocket assembly comprises a pair of substantially semi-circular sprocket halves 40 preferably formed of a polyamide or other material providing adequate strength, low friction to minimize wear, and good corrosion resistance. Each of the sprocket halves 40 has a face 42 joined at a split line 44 between the sprocket halves 40 and a concave cavity 46 which defines a concentric bore when the sprocket halves 40 are assembled to the hub. Each of the sprocket halves 40 further includes a plurality of teeth 48 about its periphery and a series of tooth pockets 50 also formed about its periphery between each pair of adjacent teeth 48. As is well known, a hub which may be of one-piece but is preferably formed from a pair of mating semi-circular halves 52, has a smooth periphery disposed to fit within the concentric bore of the joined sprocket halves 40 and includes mating cavities 54 which form a bore for the conveyor drive shaft 20 and key-way 55. The hub 52 shown in FIGS. 3 and 4 is preferably a split hub design comprised of corrosion resistant steel or plastic material while the hub 18 depicted in FIGS. 5 and 6 is comprised of a low friction material 40. As will be appreciated hereafter, the split sprocket assembly 16 shown in FIGS. 3 and 4 is utilized as a drive component while the split sprocket assembly 16 illustrated in FIGS. 5, 6 and 10 functions as an idler.

As a salient feature of the invention, the sprocket halves 40 and hubs 18 shown in FIGS. 3-6 are each provided with two sets of diametrically opposite, aligned screwthreaded apertures 56 extending radially inwardly into the hub 18. A fastener, preferably in the form of a socket cap screw 58, is screwthreaded into each of the aligned apertures 56 along an axis which is offset from the center of the tooth pocket 50 for joining the sprocket halves and the hub together. This arrangement thus forms a split sprocket assembly 16 which is readily attachable and detachable from the conveyor shaft 20 without disassembly of the conveyor shaft 20 and in the narrowest available space on the conveyor 10. One end of the faces 42 of sprocket halves 40 includes a cut out 60 such that when the sprocket halves 40 are joined, an opening 62 is formed which is aligned with one of the threaded openings 64 provided in each of the hub halves 52 of FIGS. 3 and 4. A set screw 66 is then screwthreaded into one (or both) of the threaded openings 64 formed in the solid hub and into engagement against the drive shaft 20 so as to transfer rotary movement of the drive shaft 20 to the joined sprocket halves 40. In the broadest form of the invention shown in FIGS. 5, 6 and 10, the hub halves 52 and sprocket halves 40 are joined together around the drive shaft 20 exclusively by the radially disposed socket cap screws 58 such that the sprocket halves 40 and hub halves 52 will freely rotate around the drive shaft 20 in an idler fashion. Each of the sprocket halves 40 and hub halves 52 have flat outer faces 68 which prevent the build-up of bacteria and make a split sprocket assembly 16 particularly attractive to conveying applications in food and beverage industries or any other industry requiring sanitary conditions.

The fastening of sprocket halves 40 on the hub 18 by means of the socket cap screws 58 is made possible because with the radial fastening of the sprocket halves 40 to their hub halves 52, their true concentric position on the drive shaft 20 is assured. As seen in FIG. 7, the 90° offset split line between the hub 18 and sprocket halves 40 with symmetric positioning of the radial fasteners 58 allows for equal load distribution and torque transmittal. It should also be understood that prior art sprocket assemblies rely on the use of cylinder head bolts and hex head bolts, the tensioning of which determines their clamping force. As a result, it is necessary for some prior art sprocket assemblies to require shear pins or other additional means to ensure torque transmittal through the hub to the sprocket teeth. The present invention eliminates the need for these additional means by employing tapered-head socket cap screws 58 which provide for both faster tensioning and transmittal of shear load. In addition, the socket cap screws 58 facilitate self-centering of the sprocket halves 40 with respect to the hub 18.

Turning now to FIGS. 7-9, torque transmittal from the drive shaft 20 to the hub 18 is commonly established using a key and key-way connection and one set screw for positioning. In the split hub embodiment shown in FIG. 7, one hub half 52 is formed with a key-way 70 engageable with a key 72 on the drive shaft 20. The other hub half 52 and its corresponding sprocket half 40 are formed with a further set of aligned screwthreaded apertures 74 opposite the key-way 78 and extending radially inwardly from the periphery of the sprocket half 40 and completely through the hub half 52. A set screw 76 is assembled through the aligned apertures 74 against the drive shaft 20 to mount the hub to the shaft. The embodiment of FIG. 8 is similar to FIG. 7 with the exception of a solid, one-piece hub 18. The embodiment of FIG. 9 is also similar to FIG. 8 as to the use of a solid hub 18 but replaces the key and key-way connection with a threaded passageway 78 located opposite the furthest set of aligned apertures and extending radially inwardly through the periphery of the hub 18 and completely through the hub 18. A set screw 80 is screwthreaded into the passageway 78 and extends into the drive shaft 20 on the lower portion of the hub while the set screw 76 is screwthreaded into the aligned opposite side of the hub and into engagement with the drive shaft 20. As discussed above, FIG. 10 shows the split idler assembly 16 and a split hub 18 which are joined together for free rotation about the drive shaft 20. FIG. 11 shows a split hub provided with apertures 56 for receiving the socket cap screw 58 and aperture 74-78 for receiving set screws 76, 80 and also includes suitably threaded cross fixing bores 82 formed substantially perpendicular to the axis of shaft rotation and receiving a pair of cross fixing bolts 84 to join the hub halves 52 together on the shaft 20. With the variety of options set forth in the embodiments described above, it should be understood that the split sprocket assembly 16 is extremely versatile, and advantageously provides a modular system wherein various sprocket halves 40 and hubs 18 may be interchanged with each other in a manner which saves the user inventory costs and yet ensures reliable performance under all operation conditions.

A further advantage in the manufacturing process of the new split sprocket assembly resides in the formation of the split line 44 dividing the sprocket halves 40.

The split line of available sprocket halves is commonly a 180° straight line separating the two halves with the ideal line running through the center of the sprocket assembly 16. Since the majority of sprockets favor an odd number of teeth, the split line runs either through the center of the tooth to the center of the opposite tooth pocket, or it runs through both opposite tooth pockets but offset from each tooth pocket center line. Manufacturing practice does not guarantee that both sprocket halves applied to conventional style are identical halves. In the event that the conventional sprocket halves are accidentally mixed up in the assembly and installation process, tooth pitch differences can occur at the split line of a particular sprocket assembly. This can cause disturbances in chain operation and result in product handling problems. To avoid this mix-up of sprocket halves, some manufacturers add extra positioning pins to ensure correct assembly, thus increasing costs.

The present invention features a tooth split line running from one tooth pocket 50 from one tooth pocket center to the opposite tooth pocket center resulting in a segment split line 44 deviating from 180° with any odd number of sprocket teeth 48/50 as seen in FIG. 10. This avoids possible mix-up of sprocket half positioning in assembly, eliminates tooth pitch differences and guarantees correct chain operation at no extra cost.

A 180° split line used in the new polysplit will preclude mixing of toothed halves as the apertures 60-62-74 would prevent correct assembly.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

I claim:

1. A split sprocket assembly mountable on a shaft comprising:

a pair of substantially semi-circular sprocket halves, each of said sprocket halves having surface faces joined at a split line between said sprocket halves and having a concentric bore, each of said sprocket halves further having a plurality of teeth provided about its periphery and a series of tooth pockets also formed about its periphery between each pair of adjacent teeth;

a hub disposed in said concentric bore, said hub having a throughhole disposed around said shaft;

said sprocket halves and said hub including two sets of diametrically opposite, aligned apertures, each of said aligned apertures extending radially inwardly from one of said tooth pockets on the periphery of said sprocket halves and into said hub; and a fastener within each of said aligned apertures for joining said sprocket halves and said hub together to form a split sprocket assembly attachable and detachable from said shaft, wherein said hub is formed with a passageway extending radially inwardly from the periphery of said hub and completely through said hub, and one of said sprocket halves and said hub includes a further set of aligned apertures extending radially inwardly from the periphery of said one of said sprocket halves and completely through said hub, said further set of aligned apertures being located opposite said passageway.

2. The assembly of claim 1, including a pair of set screws, one of said set screws being located within said passageway and the other of said set screws being located in said further set of aligned apertures, both of said set screws penetrating into said shaft and enabling said hub to transmit torque from the shaft.

3. A split sprocket assembly mountable on a shaft comprising:

a pair of substantially semi-circular sprocket halves, each of said sprocket halves having surface faces joined at a split line between said sprocket halves and having a concentric bore, each of said sprocket halves further having a plurality of teeth provided about its periphery and a series of tooth pockets also formed about its periphery between each pair of adjacent teeth;

a hub disposed in said concentric bore, said hub having a throughhole disposed around said shaft;

said sprocket halves and said hub including two sets of diametrically opposite, aligned apertures, each of said aligned apertures extending radially inwardly from one of said tooth pockets on the periphery of said sprocket halves and into said hub; and a fastener within each of said aligned apertures for joining said sprocket halves and said hub together to form a split sprocket assembly attachable and detachable from said shaft, wherein said hub is comprised of two halves, and each of said halves of said hub is formed with a cross fixing bore oriented substantially perpendicular to the axis of shaft rotation, each of said cross fixing bores receiving a fastener for enabling said hub to be mounted about said shaft.

* * * * *